UNITED STATES PATENT OFFICE.

FRANK L. BUCHANAN, OF ST. LOUIS, MISSOURI.

PAINT COMPOSITION.

No. 831,497. Specification of Letters Patent. Patented Sept. 18, 1906.

Application filed October 27, 1905. Serial No. 284,705.

*To all whom it may concern:*

Be it known that I, FRANK L. BUCHANAN, a citizen of the United States, residing at St. Louis, State of Missouri, have invented a certain new and useful Paint Composition, of which the following is a specification.

My invention has relation to improvements in compositions of matter primarily intended for use as a mixed paint, but which with slight variations in the proportions of its several ingredients is capable of use for a variety of purposes. Among these may be mentioned its use as a slate-roof paste, wood-preserving compound, joint-preserver, horse-hoof dressing, horse-hoof paste, and the like. For purposes of a paint the several ingredients of which the same is composed are as follows, mixed preferably in the following proportions, by weight, viz: micaceous iron, one pound; linseed-oil, (boiled,) one pound; shellac varnish, one pound; Japan varnish, one pound.

As is well known, the micaceous iron is an ore of iron known as "hematite," the present variety forming the base of my compound being specular in appearance, but having a foliated structure. It differs from "specular iron" in not possessing the metallic luster of the latter and occurs in the iron deposits throughout Missouri. Owing to its foliated structure, this ore has great covering properties and forms an admirable base for paints either alone or mixed with silicious sand. When used for roofing purposes, the proportions above specified may be qualified in the following particulars: micaceous iron, one-half pound; silicious sand, one-half pound; linseed-oil, (boiled,) one pound; shellac varnish, one pound; Japan varnish, one pound.

For various pastes, such as roof material, the varnishes may be omitted. For horse-hoof pastes and joint-preserving compounds the oil and varnishes may be omitted and refined petroleum may be substituted therefor.

Whatever be the final character of the compound and whatever the final proportions of its ingredients, it may be stated that the several ingredients are mixed together in any suitable manner and in any kind of a vessel so long as the mixture is thorough and intimate. For paint to be used on smokestacks and roofs the specific mixtures above given insure a consistency which will permit the application of the same with an ordinary paint-brush. The linseed-oil serves as the vehicle or carrier, and the shellac and Japan varnishes aid in the drying of the paint and impart thereto a consistence so as to readily spread under a brush.

Having described my invention, what I claim is—

The herein-described paint composition for use as a paint comprising the following ingredients in the proportions as specified, viz: one-half pound of micaceous iron, one-half pound of silicious sand, one pound of linseed-oil, one pound of shellac varnish, and one pound of Japan varnish.

In testimony whereof I affix my signature in presence of two witnesses.

FRANK L. BUCHANAN.

Witnesses:
EMIL STAREK,
MARY D. WHITCOMB.